United States Patent [19]

Ozaki

[11] Patent Number: 4,792,868
[45] Date of Patent: Dec. 20, 1988

[54] RECORDING/REPRODUCING DEVICE WITH MEANS FOR SWITCHING INDUCTANCE OF SUCH DEVICE FOR USE IN A FLOPPY DISK APPARATUS

[75] Inventor: Hisami Ozaki, Fuji, Japan

[73] Assignee: Kabushiki Kaisha Toshiba, Kawasaki, Japan

[21] Appl. No.: 906,745

[22] Filed: Sep. 12, 1986

[30] Foreign Application Priority Data

Sep. 30, 1985 [JP] Japan ................. 60-216425

[51] Int. Cl.⁴ .............................. G11B 5/17; G11B 5/02
[52] U.S. Cl. ........................................ 360/46; 360/67
[58] Field of Search .................. 360/46, 67, 68, 62, 360/123

[56] References Cited

U.S. PATENT DOCUMENTS

| | | | |
|---|---|---|---|
| 2,933,721 | 4/1960 | Hagopian | 360/123 |
| 3,248,717 | 4/1966 | Mayhew | 360/62 |
| 3,881,194 | 4/1975 | Heaslett et al. | 360/62 |
| 4,249,219 | 2/1981 | Aoi et al. | 360/46 |
| 4,402,027 | 8/1983 | Nakamura et al. | 360/123 |
| 4,480,275 | 10/1984 | Fawkes | 360/46 |
| 4,651,235 | 3/1987 | Morita et al. | 360/46 |

FOREIGN PATENT DOCUMENTS

| | | | |
|---|---|---|---|
| 638793 | 3/1962 | Canada | 360/123 |
| 52-67311 | 3/1977 | Japan | 360/62 |
| 54107146 | 4/1981 | Japan | 360/123 |
| 55-19025 | 9/1981 | Japan | 360/123 |
| 56-51360 | 10/1982 | Japan | 360/123 |
| 5612966 | 2/1983 | Japan | 360/123 |

Primary Examiner—Raymond F. Cardillo
Assistant Examiner—Kevin J. Fournier
Attorney, Agent, or Firm—Finnegan, Henderson, Farabow, Garrett, & Dunner

[57] ABSTRACT

A recording/reproducing device for use in a floppy disk apparatus. The device has a first coil and a second coil, both wound arond a common core. The coils are connected to each other at one end, and have taps, respectively. Both coils have characteristics optimized for data-reading. A read circuit is connected to the second ends of the coils. A write circuit is connected to the taps of the coils. The write circuit writes data on a recording medium by using that portion of the first coil which extends between the tap of the first coil and the connection point between the coils, and that portion of the second coil which extends between the tap of the second coil and the connection point between the coils.

5 Claims, 2 Drawing Sheets

RECORDING/REPRODUCING DEVICE WITH MEANS FOR SWITCHING INDUCTANCE OF SUCH DEVICE FOR USE IN A FLOPPY DISK APPARATUS

BACKGROUND OF THE INVENTION

This invention relates to a recording/reproducing device for use in a floppy disk apparatus.

A floppy disk apparatus is provided with a read/write head (or a magnetic head). The head reads data from a floppy disk and also writes data onto the floppy disk. It comprises a core and a coil wound around the core. The coil has a center tap and is connected to a read/write circuit.

The coil of the head is used to both read and write data. If the coil is designed to read data efficiently and has a relatively high inductance for this purpose, the head cannot efficiently write data since the "write" current cannot quickly increase or decrease. The efficiency of writing data is reduced particularly when the head is driven by a low voltage (as in a floppy disk apparatus driven by a 5-V battery), and a high voltage cannot be applied to the coil. Conversely, if the coil is adapted to write data and has a relatively low inductance, the read output of the coil (i.e., induced electromotive force) is small. The output of the coil must therefore be amplified by an amplifier having a high amplification factor. As a result, the S/N ratio of the output will decrease.

SUMMARY OF THE INVENTION

An object of the present invention is to provide a recording/reproducing device for use in a floppy disk apparatus, which can be driven by a low voltage to both read and write data, with a high efficiency.

To achieve this object, a recording/reproducing device of the invention comprises:

a read/write core (61) for recording data onto a magnetic recording medium (65) and reading the data from the magnetic recording medium (65), a coil wound around the read/write core (61) and consisting of a first coil (23) and a second coil (27) connected to each other at one end to which a prescribed voltage is applied and having center taps (21, 25), respectively, a read circuit (13) connected to the other end (31) of said first coil (23) and also to the other end (33) of said second coil (27), and a write circuit (15) connected to the center tap (21) of said first coil (23) and also to the center tap (25) of said second coil (27).

To write data onto the magnetic recording medium, a write current is supplied to the coils 23 and 27, a portion of which have a low inductance. Therefore, the write current can change quickly. To read the data from the magnetic recording medium, the coils 23 and 27, which have a high inductance are used to produce output signals of a relatively high voltage. The recording/reproducing device of the invention can thus both write and read data efficiently, even if it is driven by a relatively low voltage.

DETAILED DESCRIPTION OF THE PREFERRED EMBODIMENT

One embodiment of the invention will now be described with reference to FIGS. 1–3.

Figure 1:
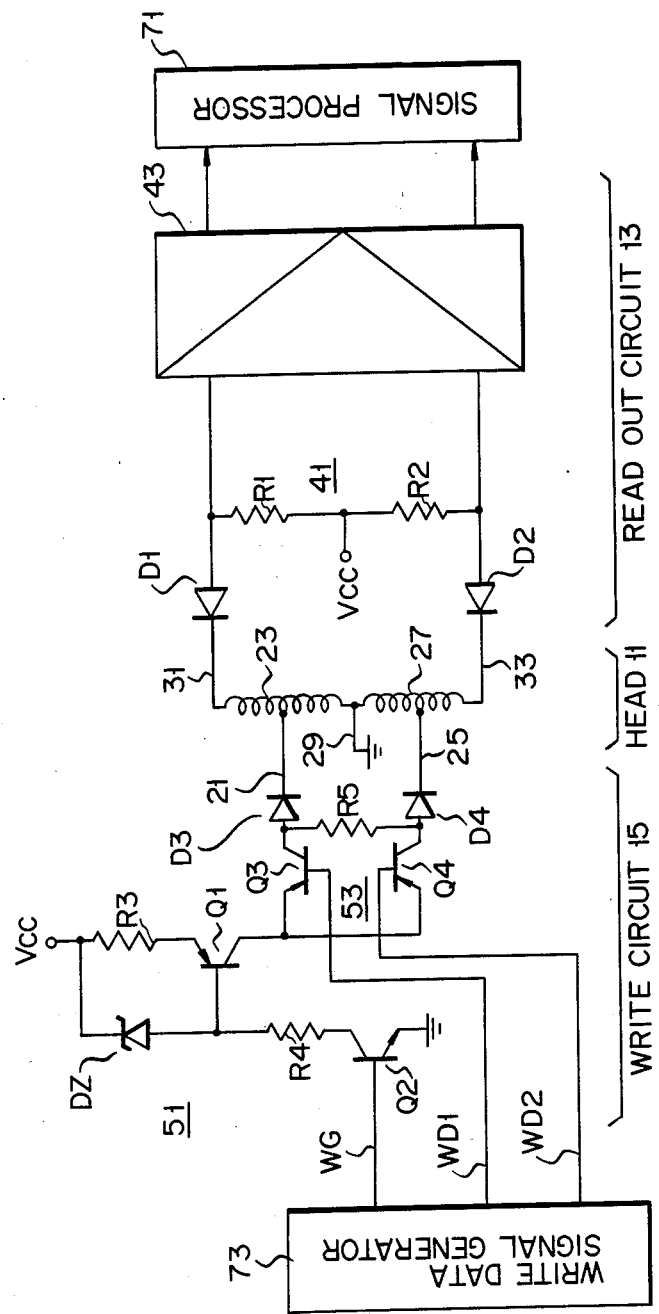
FIG. 1 is a circuit diagram of the recording/reproducing device according to the present invention.
Figure 2:
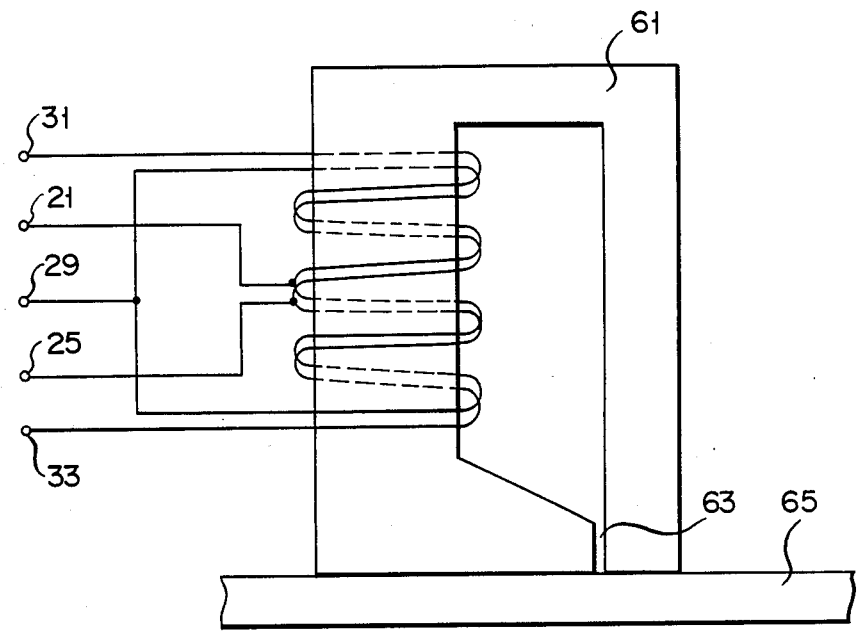
FIG. 2 is a diagram showing the positional relationship between the core of the device shown in FIG. 1 and the coils of the device.

FIG. 1 shows the recording/reproducing device of the invention, designed for use in a floppy disk apparatus. The device comprises three main components: read/write head 11, read circuit 13, and write circuit 15.

Read/write head 11 has a coil. The coil consists of A coil 23 having a tap 21, and B coil 27 having a tap 25. Coils 23 and 27 are connected to each other at one end. Another tap 29 is provided at the connection point between coil 23 and 27. Tap 29 is grounded. As shown in FIG. 2, A coil 23 and B coil 27 are wound around core 61, such that they generate magnetic fluxes extending in opposite directions.

Read circuit 13 comprises voltage-dividing circuit 41, differential amplifier 43, and diodes D1 and D2. Circuit 41 includes registors R1 and R2 connected to each other at one end. Voltage Vcc is applied to the connection point between registors R1 and R2. Diodes D1 and D2 are used to prevent a reverse flow of currents. The cathode of diode D1 is connected to the other end 31 of A coil 23, and the anode of diode D1 is coupled to the other end of registor R1. The cathode of diode D2 is coupled to the other end 33 of B coil 27, and the anode of diode D2 is connected to the other end of registor R2. The anodes of diodes D1 and D2 aee coupled to the input terminals of amplifier 43. The output signal of the amplifier is supplied to a signal processor 71.

Write circuit 15 comprises circuit 51 for generating a constant current in response to a write gate signal WG, and a circuit for supplying the constant current 53 in response to write data signals WD1 and WD2. Circuit 51 consists of resistors R3 and R4, zener diode DZ, and transistors Q1 and Q2. Resistor R3 is coupled at one end to voltage source Vcc. Zener diode DZ has its cathode coupled to voltage source Vcc. Transistor Q1 has its base coupled to the anode of zener diode DZ, and its emitter connected to the other end of resistor R3. Resistor R4 is connected at one end to the anode of zener diode DZ. Transistor Q2 has its collector coupled to the other end of resistor R4, its emitter grounded, and its base connected to receive write gate signal WG.

Circuit 53 includes transistors Q3 and Q4, diodes D3 and D4, and resistor R5. The transistors Q3 and Q4 have their emitters coupled to the collector of transistor Q1. The cathode of diode D3 is connected to center tap 21 of A coil 23. Diode D4 has its anode coupled to the collector of transistor Q4 and its cathode connected to center tap 25 of B coil 27. Resistor R5 is coupled between the anodes of diodes D3 and D4.

Write data/signal generating circuit 73 is provided to supply signals WG, WD1, and WD2 to the bases of transistors Q2, Q3, and Q4, respectively.

The operation of the device shown in FIG. 1 will now be explained with reference to FIGS. 2 and 3.

To write data on recording medium 65, circuit 73 raises write gate signal WG to high level and outputs write data signals WD1 and WD2. Signals WD1 and WD2 are of opposite phases and correspond to data to be written on medium 65. When signal WD1 is at high level, the write current (i.e., the output current of circuit 51) flows to A coil 23 through resistor R3, transistors Q1 and Q3, diode D3, and center tap 21. In other words, the write current flows from center tap 21 to coil LA1 of A coil 23 an further to center tap 29 (ground). Coil LA1 generates a magnetic flux, which leaks through gap 63. The flux is applied to recording medium 65, thus writing the data on medium 65. When write data signal WD1 falls to low level, whereas write data signal WD2 rises to high level, the write current flows to B coil 27 through resistor R3, transistors Q1 and Q4, diode D4, and center tap 25. In other words, as shown in FIG. 3, the current flows to center tap 29 through tap 25 and coil LB1 of B coil 27. When the current flows though coil LB1, coil LB1 generates a magnetic flux extending in the direction opposite to that in which the flux generated by coil LA1 extends. hhe magnetic flux leaks through core gap 63, thus writing the data on recording medium 65. Both write data signals WD1 and WD2 are of a known type. They are either FM or MFM signals.

To read data from recording medium 65, a bias current is supplied from power voltage source Vcc to A coil 23 through resistor R1 and diode D1, and also to B coil 27 through resistor R2 and diode D2. The magnetic flux corresponding to the data recorded on medium 65 is detected at core gap 63. The flux flows through core 61. A coil 23 and B coil 27 generate an electromotive force oorresponding to the change in the magnetic flux. The electromotive force changes the bias currents flowing through coils 23 and 27, whereby voltages of opposite phases are generated at one end of resistor R1 and at one end of resistor R2. Amplifier 43 amplifies the difference bewween these voltages, and thereby outputs a read data signal. The read data signal is processed by signal processor 71.

The inductance of coil LA1 is lower than that of entire A coil 23. Similarly, the inductance of coil LB1 is lower than that of entire B coil 27. It is through low inductance coils LA1 and LB1 that the write currnnt flows during the data-writing process. Hence, the write current can quickly increase, even though the power supply voltage (Vcc) is as low as 5V. Read/write head 11 can therefore write data efficiently on recording medium 65.

Since A coil 23 and B coil 27 have sufficient inductance, they can generate a relatively high voltage. A sufficiently high level read data signal can therefore be obtained by resistors R1 and R2. Since two signals of opposite phases are supplied to the input terminals of differential amplifier 43, amplifier 43 can produce an output signal of a sufficien S/N ratio, even if its amplification factor is relatively low.

The read/write head according to the invention can write and read data efficiently, even if the drive voltage applied to it is as low as 5V. It can therefore be incorporated in floppy disk apparatuses driven by a 5V battery, and can help provide a floppy disk apparatus with a low power consumption.

The invention is not limited to the above embodiment. Coils LA1, LA2, LB1, and LB2 can have a different relationship with respect to inductance. In other words, the characteristics of A coil 33 and B coil 27 can be determined, for efficient data-reading, in accordance with the resistances of resistors R1 and R2, the power supply voltage, the amplification factor of amplifier 43, and the like. Further, the positions of center taps 21 and 25 (i.e., characteristics of coils LA1 and LB1) can be changed in accordance with the resistance of resistor R5, the speed at whic the write current increases, and the like. In view of the desired characteristics of the output data signal and the nature of the data recordable on recording medium 65, it is preferable that coils LA1 and LB1 have the same characteristics, as should also A coil 23 and B coil 27.

Neither read circuit 13 nor write circuit 15 is limited to the structure shown in FIG. 1. Changes and modifications can be made to them. Moreover, signal processor 71 and signal generator 73 can have structures other than those shown in FIG. 1. Signal processor 71 and signal generator 73 can be of known types, the former for processing FM or MFM signals, and the latter for generating FM or MFM signals. Further, signals WB, WD1, and WD2 need not be limited to particular types.

Figure 3:
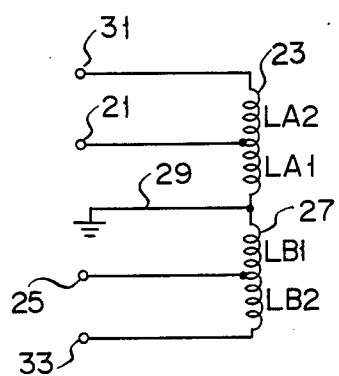
FIG. 3 is a diagram showing the characteristics of the coils shown in FIG. 1.

As shown in FIG. 3, A coil 23 and B coil 27, each having one center tap, are connected, thus forming a single coil. Even if coils 23 and 27 are replaced by one coil having three center taps, or even if, they are replaced by four coils connected in series, in which case three taps are connected to the three connection points between the four coils, either arrangement of these coils is included in the scope of the present invention.

What is claimed is:

1. A recording/reproducing device for a magnetic recording apparatus, comprising:
   a read/write transducer having an inductance for recording data onto a magnetic recording medium and reading the data from the magnetic recording medium; and
   means for switching an inductance of the read/write transducer between an upper value for reading the data and a lower value for recording the data, said switching means including:
      a coil on the read/write transducer including first and second grounded coil portions, each portion including a tap thereon,
      a read circuit connected to the first and second coil portions for generating read signals representative of the flux changes on the recording meidum, and
      a write ciruit connected to the taps of the first and second coil portions for providing write currents corresponding to the data to be recorded to the first and second coil portions, said write circuit including means for selectively supplying a predetermined current to the first coil portion or the second coil portion through the tap thereof.

2. A recording/reproducing device for a a magnetic recording apparatus, comprising:
   a read/write transducer having an inductance for recording data onto a magnetic recording medium and reading the data from the magnetic recording medium; and
   means for switching an inductance of the read/write transducer between an upper value for reading the data and a lower value for recording the data, including:
      first and second coils on the read/write transducer for detecting changes of magnetic flux on the recording medium, each of said first and second coils being ground at one end and having a tap between the one end and the other end thereof,
      a read circuit, connected to each of the other ends of the first and second coils, for generating read signals reprsentative of the flux changes on the recording medium, and
      a write circuit connected to each of the taps of the first and second coils for providing write currents corresponding to data to be recorded to the first and second coils.

3. A recording/reproducing device for a magnetic recording apparatus, comprising:
- a read/write transducer having an inductance for recording data onto a magnetic recording medium and reading the data from the magnetic recording medium; and
- means for switching an inductance of the read/write transducer between an upper value for reading the data and a lower data for recording the data, said switching means including:
  - a coil on the read/write transducer including first and second grounded coil portions, each portion including a tap thereon,
  - a read circuit connected to the first and second coil portions for generating read signals representative of the flux changes on the recording medium, and
  - a write circuit connected to the taps of the first and second coil portions for providing write currents corresponding to the data to be recorded to the first and second coil portions, wherein the magnetic recording apparatus generates first and second control signals representing data to be recorded on the recording medium, and wherein said write circuit includes:
    - a constant current circuit for generating a constant current,
    - means for supplying constant current to the tap of said first coil portion in response to the first control signal, and
    - means for supplying the constant current to the tap of said second coil portion in response to the second control signal.

4. A recording/reproducing device for a magnetic recording apparatus, comprising:
- a read/write transducer having an inductance for recording data onto a magnetic recording medium and reading the data from the recording medium;
- a coil on the read/write transducer, including first and second coil portions, detecting changes of magnetic flux on the recording medium;
- means for switching an inductance of the read/write core between an upper value for reading the data and a lower value for recording the data; and
- a read circuit connected to the first and second coil portions for supplying bias currents to the first and second coil portions and generating read signals representative of the flux changes on the recording medium.

5. A recording/reproducing device for a magnetic recording apparatus, comprising:
- a read/write transducer having an inductance for recording data onto a magnetic recording medium; and
- means for switching an inductance of the read/write transducer between an upper value for reading the data and a lower value for recording the data, said switching means including:
  - a coil on the read/write transducer including first and second grounded coil portions, each portion including a tap thereon,
  - a read circuit connected to the first and second coil portions for generating read signals representative of the flux changes on the recording medium, wherein said read circuit includes
    - bias means, for supplying bias currents to the first and second coil portions, said bias means comprises
      - a first diode connected to said first coil portion,
      - a first resistor connected to the anode of the first diode, the first resistor receiving a predetermined voltage,
      - a second diode connected to said second coil portion, and
      - a second resistor connected to the anode of the second diode, the second resistor receiving the predetermined voltage, and wherein said read circuit includes an amplifier connected to the first and second resistors for differentially amplifying voltages of the first and second resistors and generating the read signals.

* * * * *